(12) United States Patent
Bobryshev et al.

(10) Patent No.: US 8,505,245 B2
(45) Date of Patent: Aug. 13, 2013

(54) SYNERGETIC TRAINING DEVICE

(76) Inventors: Miroslav Valerjevitsh Bobryshev, Irkutsk (RU); Irina Evgenjevna Bobrysheva, Irkutsk (RU)

( * ) Notice: Subject to any disclaimer, the term of this patent is extended or adjusted under 35 U.S.C. 154(b) by 500 days.

(21) Appl. No.: 12/680,634

(22) PCT Filed: Oct. 31, 2007

(86) PCT No.: PCT/RU2007/000603
§ 371 (c)(1),
(2), (4) Date: Mar. 29, 2010

(87) PCT Pub. No.: WO2008/076002
PCT Pub. Date: Jun. 26, 2008

(65) Prior Publication Data
US 2010/0216100 A1    Aug. 26, 2010

(51) Int. Cl.
*G09B 9/04* (2006.01)
(52) U.S. Cl.
USPC ........... 52/64; 52/7; 52/8; 52/9; 52/29; 52/31; 52/65; 52/66; 52/235; 108/22; 108/139; 434/157; 434/237; 434/317; 434/350; 434/431; 434/432; 472/29; 472/35; 472/36
(58) Field of Classification Search
USPC ................. 434/157, 237, 317, 350, 431, 432; 52/7, 8, 235, 9, 29, 31, 64, 65, 66; 108/22, 108/139; 472/29, 35, 36
See application file for complete search history.

(56) References Cited

U.S. PATENT DOCUMENTS

| 479,001 A | 7/1892 | Gutierrez | |
| 3,462,855 A * | 8/1969 | Cornish | 434/222 |

(Continued)

FOREIGN PATENT DOCUMENTS

| GB | 1129779 | 10/1968 |
| RU | 2 085 998 C1 | 7/1997 |

(Continued)

OTHER PUBLICATIONS

Pearson, "SASI Mass Scheduling Training Guide", Nov. 2005, Pearson School System, pp. 1-120.*

(Continued)

*Primary Examiner* — Jack Yip
(74) *Attorney, Agent, or Firm* — Ladas & Parry LLP

(57) ABSTRACT

The invention can be efficiently used for intensively learning different disciplines, including foreign languages, and for forming and automating operational skills of professionals in different field of activity. It makes it possible to obtain a technical result and a high-quality intensive training. The use of a training aid is developed according to a synergetic theory in the form of a synergetic training device and makes it possible to provide a synergetic variant of intensive training. The synergetic training device is embodied in a dynamic technical device consisting of several soundproof booths which comprise training facilities and technical means using a sensor system. The synergetic training device makes it possible to intensify and simultaneously diversify the training activity of trainees, to develop an integrated-in-groups training method according to a 'assistant-students' system consisting in simultaneously training mini-divisions under the guidance of a large group of assistants, including technical assistants. The possibility of simultaneously taking into account all levels of training provides the method with a multi-level character, while the possibility of taking into account the peculiarities of the students guarantees the high antropological attitude thereof.

15 Claims, 9 Drawing Sheets

(56) References Cited

U.S. PATENT DOCUMENTS

| | | | |
|---|---|---|---|
| 3,623,283 A | | 11/1971 | Abromavage et al. |
| 3,694,933 A | * | 10/1972 | Busch ............................ 434/432 |
| 3,696,805 A | | 10/1972 | Sweeten et al. |
| 3,778,911 A | * | 12/1973 | Woolman ...................... 434/432 |
| 3,818,609 A | * | 6/1974 | Woolman ...................... 434/237 |
| 4,095,379 A | | 6/1978 | Wentraub |
| 5,316,480 A | | 5/1994 | Ellsworth |
| 5,653,065 A | | 8/1997 | McIlwain |
| 5,957,698 A | * | 9/1999 | Dean et al. ................... 434/350 |
| 6,041,215 A | * | 3/2000 | Maddrell et al. .............. 434/317 |
| 6,148,568 A | | 11/2000 | Beasley |
| 6,205,716 B1 | * | 3/2001 | Peltz ............................... 52/36.2 |
| 6,253,494 B1 | * | 7/2001 | Shaffron ............................ 52/7 |
| 6,293,052 B1 | * | 9/2001 | Varnado, Jr. ........................ 52/7 |
| 7,980,858 B2 | * | 7/2011 | Valoe et al. ................... 434/432 |
| 2003/0003954 A1 | * | 1/2003 | Kugler ........................... 455/556 |
| 2003/0129574 A1 | * | 7/2003 | Ferriol et al. ................. 434/362 |
| 2009/0000228 A1 | * | 1/2009 | Valoe et al. ..................... 52/235 |

FOREIGN PATENT DOCUMENTS

| | | |
|---|---|---|
| RU | 2 193 806 C2 | 11/2001 |
| RU | 2 197 748 C2 | 1/2003 |
| RU | 2004127989 | 2/2006 |
| SU | 365754 | 1/1973 |
| SU | 779554 | 11/1980 |
| SU | 976946 | 11/1982 |
| SU | 1650892 A1 | 12/1988 |

OTHER PUBLICATIONS

Anonymous, entitled Photonic Materials (OLED, PHOLED, AMOLED . . . ), Universal Display Corporation, Sep. 30, 2009, pp. 1-5.
Anonymous, entitled "Paper" http://www.t-ink.com/, pp. 1-3.
Patents Act 1977: Patents Rules 2007, Notification of Grant: Patent Serial No. GB2474088.
Patents Act 1977, Examination Report under Section 18(3) for Application No. GB1007388.0.

* cited by examiner

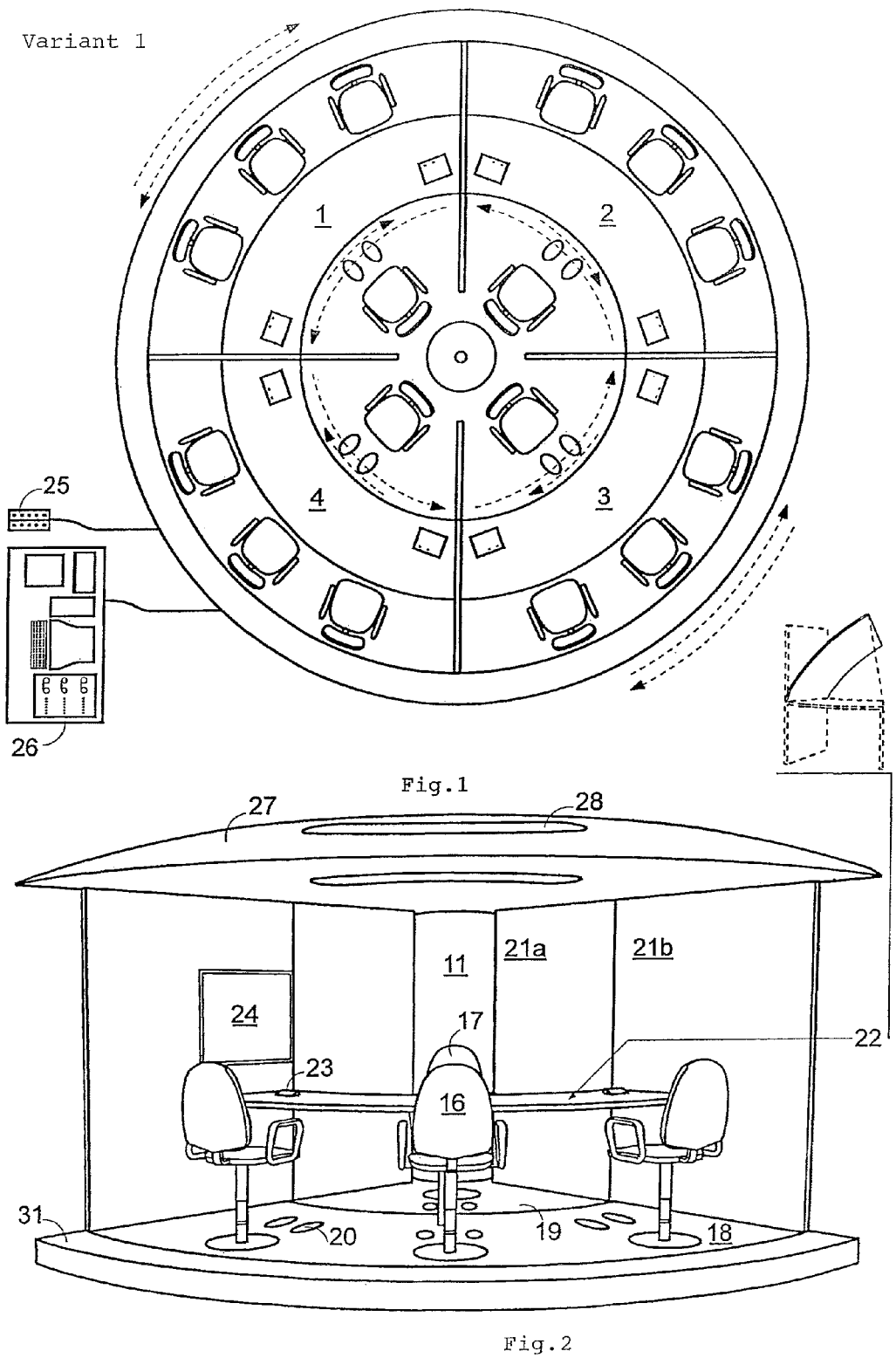

Variant 2

Variant 3

Variant 4

SYNERGETIC TRAINING DEVICE

TECHNICAL FIELD

This application is a 371 of International Application PCT/RU2007/000603 filed 31 Oct. 2007 entitled "SYNERGETIC TRAINING DEVICE AND A TRAINING MODE", which was published in the Russian language on 26 Jun. 2008, with International Publication Number WO 2008/076002 A2, the content of which is incorporated herein by reference.

The invention relates to education. It is effective in intensive foreign language teaching and studying other subjects, as well as in forming and maintaining vocational skills of employees in various spheres of activity.

BACKGROUND ART

The objective of the claimed invention is a device providing essential increase in the effectiveness of intensive teaching and training.

Analysis of traditional organization and realization of training and intensive courses has shown that they have one-sided concentration: a) on the content of the course (various business courses); b) on psychological and communicative methods of teaching (G. Lozanov, G. A. Kitaygorodsky, I. Yu. Shekhter, J. O'Connor and J, Seymour, J. Grinder and A. Pligin); c) on excessive use of technological means in teaching process (mainly using computers) (J. A. Hellman, A. M. Dolgorukov, A. N. Burov, L. G. Kashkurevich).

Disadvantages of traditional methods of accelerating teaching methods can be overcome provided the concept of synergetics (H. Haken) is applied. The technology of synergetic training has been developed based on the concept, said technology including a synergetic training device and a synergetic intensive training method. The synergetic training device and the teaching method have an advantage of overcoming the one-sidedness of the teaching process and combining content, methodological, psychological, communicative, technological and other components of the process together.

In the process of intensive teaching two didactic interaction schemes prevail: either "a teacher-students" or "a computer-student". In the first case it is impossible to completely involve students in the study process since a teacher cannot attract attention of all students at the same time, and the teacher can interact with each student only in turn. In the second case it is in reverse since activity of a student is completely individualized and introverted as the student is deprived of any interaction with the learning environment. Contrary to that, the synergetic training device provides (due to its structural and dynamic features) for constant and at the same time diversified intensification of learning activity of all students without exception from live communication to introverted (by information systems) activity using a new complex group system ("assistants-students") but not traditional didactic approaches.

The psychological aspect happened to be rather useful in all variants of intensive teaching. However cultural differences in the educational activity have never been taken into account. The synergetic training device allows quick modifying of the system of tasks and exercises taking into account not only psychological but also cultural peculiarities of each student.

The problem of organizing space for teaching, in particular in case of accelerated teaching methods has been discussed by educators for long time. Usually the problem is solved by some changes in what is placed in a teaching room (design, pieces of furniture, technical means) or use of different teaching forms (arranging student places in a circle or semicircle in role games, games with a ball, etc.). The room for teaching still remains square of rectangular. The synergetic training device helps to go beyond traditional forms and reorganize the teaching space architecturally followed by technical and conceptual aspects: creating spherical (continually-concentric) type of a teaching room, a training class, a language laboratory or a computer training centre. The device provides for using new method and projects in interaction with the trainees substantially widening methodological, psychological and communicative aspects of teaching.

Study of training and intensive teaching has revealed that, on the one hand, usually computers, audio devices, projectors and other special apparatuses are used as technical means playing an ancillary role and do not changing the basics of the process. The technical means used in the claimed training device are not just ancillary aids. They are automatically controlled technical assistants operating together with expert assistants (trainers) in a well-planned system, i.e. the technical means are "personified" technical means creating an anthropologically oriented feature of the training device.

On the other hand, a multimedia simulator is known from prior art (U.S. Pat. No. 005,316,480 A, 1994). The device is arranged on the base of a usual trailer for training some vocational skills. A device for teaching comprising work places for students and a big number of means for audio-visual presentation of information and means for communication is also known (RU 2197748 C2, 2000). The disadvantage of these known inventions is excessive use of technical means for rather narrow specialization: special technical classes with lack of live communication required for a normal teaching process.

The claimed device has been created on the basis of practice and research experience. It is an anthropologically oriented room-transformer with structure and technical means being variable wherein live contacts between teachers and students remain essential component in the teaching process in the room. The technical means of the device play the role of technical assistants. They do not replace a teacher but they make teacher's efforts more effective. It is a harmonious combination of roles and functions of a human being and technical means. For the purpose of monitoring and controlling rotation of the synergetic training device and thereby providing high level of safety and organization of teaching process, a sensor system has been created based on flexible electronics wherein microcircuits, membrane and loudspeakers are printed on a flexile substrate (paper, film) using conducting inks (T-Ink; Xerox; Mikael Gulliksson technologies: using by McDonald's Corp., Johnson & Johnson Corp., American Express Co., MeadWestvaco Corp., Fisher Price Inc.) in contrast to traditional technologies wherein microcircuits are fixed on a solid substrate using photolithography, for example on silicon wafers when producing integrated circuits, or on glass substrates when producing liquid-crystal displays. Slim flexible plates of photonic plastic capable of emitting light signals when electric current passes through them are used for the first time as the base of the synergetic training device elements (OLED technologies: AMOLED, PHOLED, Samsung SDI; FOLED XEL-1, Sony Co.; R2R OLEDs, General Electric Co.; White OLED Lighting, OSRAM Opto Semiconductors Inc.). Microcircuits of a photonic elements are produced by printing in conducting ink on paper forming a sensor device having combined functions of a controller and an activator of rotation with the functions of a transmitter-receiver and audio-light indicator.

Photon-emitting plastic is also used in the lighting system of the synergetic training device (White OLED Lighting, OSRAM Opto Semiconductors Inc.; AMOLED, PHOLED, Samsung SDI; R2R OLEDs, General Electric Co.). Its plates mounted on the roof serve as light-emitting diodes when they are connected to the AC network.

Arrangement. It is known that a synergetic system is characterized by discontinuity (intermittence), multiplicity of structures of similar architectonics combined in a complex unit, interaction, behavior as a single unit, feedback (from particulars to generals and from generals to particulars), soft driving, uniform distribution of actions between all part, uniform pace and one speed of advancing. In general it is about the dynamics and concentricity of the system, wherein the first property assumes advancement and activity, and the second one—the form of space organization.

Above conditions are better met when the technical arrangement is in the form of a circle with compact concentration of big number of structural units rotating in a predetermined mode around its axis. In this way the synergetic training device has been developed, i.e. a teaching arrangement for thorough training of studied material and forming stable practical skills.

Technical result: providing special teaching method—synergetic variant of intensive training.

Said result is achieved by using a new means for teaching: synergetic training device comprising soundproof booths equipped with teaching aids and technical means, a lighting line, and a sensor system. The booth has a form of a spherical segment. The booths placed together form a circle divided into two operational elements: a central element and an external element designed to rotate in predetermined mode separately from each other; when one element rotates, the other is static. The central element comprises an inner metallic wheel with fixed central part of suspended floor with photonic elements, central portions of soundproof partitions and an inner row of seats; the external element comprises an external metallic wheel and placed on it and fixed an external part of the floor with photonic elements, external portions of the soundproof partitions, an external row of seats, tables with raising tabletops and technical means.

As the sensor system is formed by a scope of photonic elements with microcircuits made by printing in conducting ink on paper, said system through special processor of said photonic elements strictly controls the rotation of the synergetic training device: processing state of the photonic elements; sending signals through input-output channels to computers; activating layers of figures of conducting ink reproducing audio signals; switching on photonic elements, lighting line and drive system connected to the AC network enabling them to operate, wherein the sensor system can be operated independently by the special photonic element processor using inner wire or wireless method or by combined operation of the outer computer of the central control unit controlling microcircuits of the photonic elements by a wireless method.

The roof has a lighting system comprising light-emitting diodes of a photon-emitting plastic connected to the AC network and controlled by a central unit computer through the microcircuits of the photonic elements of the device using a wireless method.

The device can be transformed in special teaching rooms: a language laboratory, a computer training room, training center or a techno-center with mixed technical means.

BRIEF DESCRIPTION OF THE DRAWINGS

FIG. 1 is a plan view of the synergetic training device of the first variant.

FIG. 2 is a general view of a cabin of the synergetic training device of the first variant.

FIG. 2 is a view of the two wheels.

DETAILED DESCRIPTION OF THE DRAWINGS AND MODES FOR CARRYING OUT THE INVENTION

Figure 14:
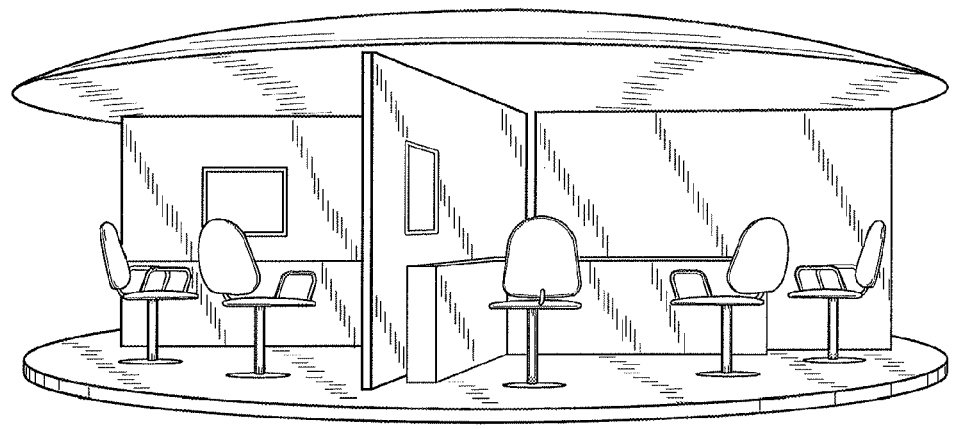
FIG. 14 is a general view of the first variant of the device

A plan view of the synergetic training device of the main variant is shown in FIG. 1. The device comprises four soundproof booths (1-4) with four seats each. A cabin is shown in FIG. 2, said cabin comprises a central part 19 of the suspended floor and an external part 18 of the suspended floor with photonic elements 20; a border 31; two parts 21 (central part 21a and outer part 21b) of a soundproof partition; a table 22 with two tops that can be raised at an angle; seats 16 and 17, one seat 17 of the seats (from the inner row) faces the three other seats 16 (from the outer row). There is a technical means 23 and a whiteboard 24. The device also comprises a roof 27 with photonic lamps 28 in the shape of plates. This variant can be used for simultaneous teaching of four minigroups. The seats for students are in the outer part of the device. This variant is transformable in the variants 2, 3 and 4. The first variant of the synergetic training device is shown in FIG. 14, side view.

Figure 3:
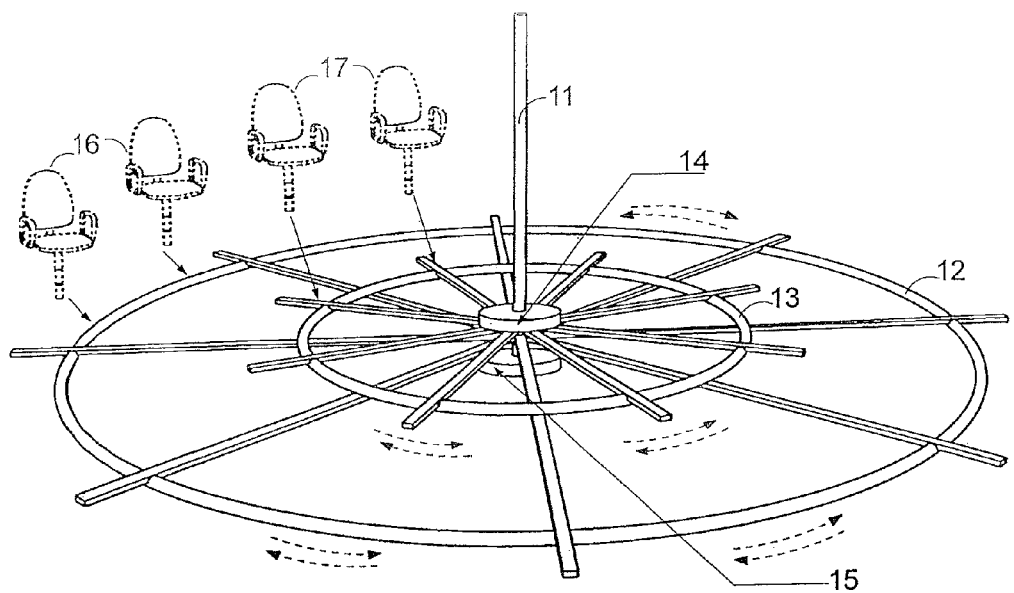
Figure 4:
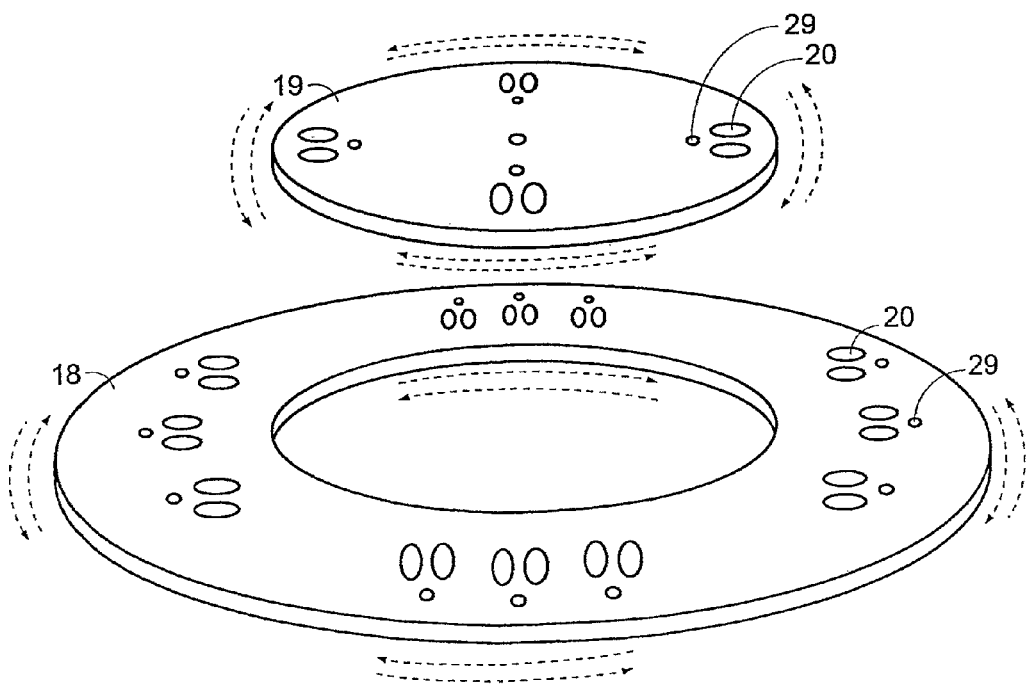
FIG. 4 is a view of the floor structure.
Figure 5:
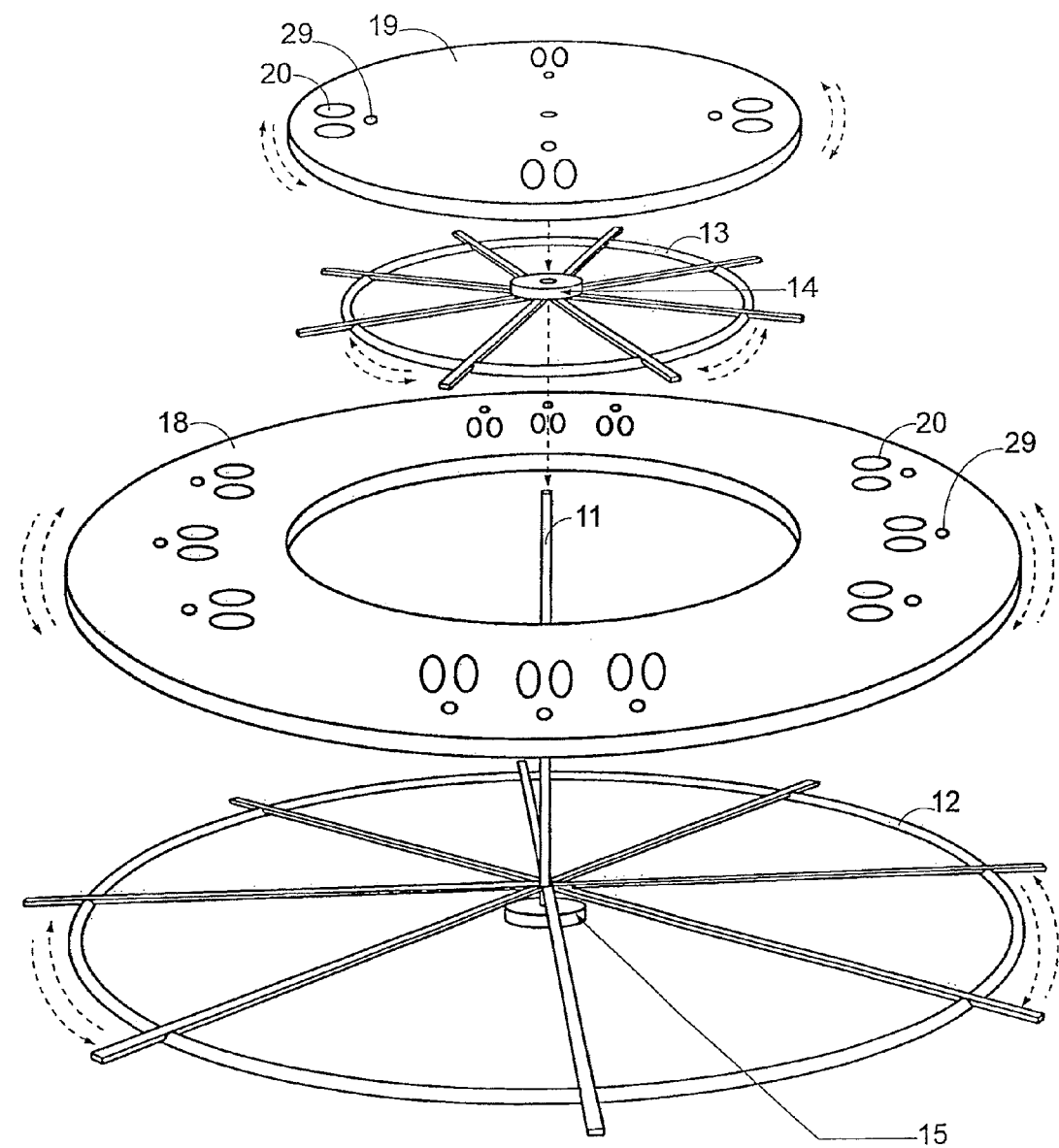
FIG. 5 is an exploded view of the platform of the synergetic training device.

Assembling of the training device includes the following steps. As shown in FIG. 3, two metal wheels, inner wheel 13 and outer wheel 12 of different diameters, are placed in turn on a vertical tubular shaft 11 (first the wheel 12 and then the wheel 13) and arranged in the lower part of the shaft near two drives 14 and 15 so that the wheels can move free and independent of each other around the shaft at a small height from the base. Then the booths are formed. Legs of the seats 17 of the inner row and the legs of the seats 16 of the outer row are welded to the inner wheel and the outer wheel correspondingly. As shown in FIGS. 4 and 5 two parts of the suspended floor are placed on the wheels, the central part 19 on the wheel 13 and the outer part 18 on the wheel 12, both with the photonic elements 20 of photon-emitting plastic and the holes for the seat legs 29. On the top the parts of the soundproof partition are arranged (see FIG. 2), the inner part 21a on the central part of the suspended floor, and the outer part 21b on the outer part 18 of the suspended floor. On the outer part of the suspended floor there are also tables 22 with raised tops and fixed technical means 23. The blackboard 24 is also mounted. Thus, two work elements of the structure is formed, said elements can rotate independently of each other in a predetermined mode. The roof 27 is rigidly connected only to the device shaft 11 allowing free rotation of the work elements.

In the same way the other devices with both rotatable elements are assembled:

a) the central work element (FIG. 3) comprises the inner wheel 13 with the seats 17 of the inner row, (then FIG. 2) with the central part of the floor 19, the photonic elements 20 and the central parts of the partitions 21a;

b) the outer work element (FIG. 3) comprises the outer wheel 12 with the seats 16 of the outer row, (then FIG. 2) with the central part of the floor 18, the photonic elements 20 and the outer parts of the partitions 21b the tables 22 and the teaching aids 23 and 24.

The materials are: plastic, photon-emitting plastic, soundproof means, metal, wood, paper, conducting ink. The strong bearing wheels, the shaft, the elements of support assemblies and fixing elements of the training device are maid of hardened wear-resistant steel for providing high rigidity and durability. The tables and the outer layer of the partitions are made of light and strong plastics, the partitions are perforated. The inner space of the partitions is filled with glass-fiber board, foam plastic and glass cloth. Strong fixing elements are used for mounting the wooden floor, the soundproof partitions and the plastic tables. All major elements are statically and dynamically balanced.

The lamps and photonic elements are made of a flexible photon-emitting plastic capable of emitting light when an electric current flows through it. The microcircuits of the photonic elements, the membrane and the loudspeakers are produced by printing in conducting ink on paper.

Figure 7:
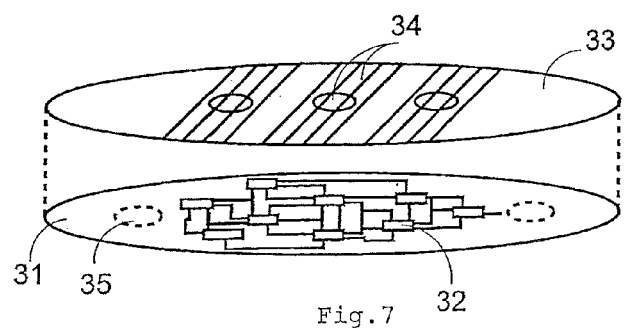
FIG. 7 is a view of a photonic element structure.

The layers of the photonic elements (FIG. 7) are: a first layer made of a flexible photon-emitting plastic 31 with sensors 35 beneath the layer; a second layer being the layer of microcircuits 32 produced by printing in conducting ink on paper; and a third layer made of film paper 33 with printed figures 34 of conducting ink layers (the membrane and loudspeakers).

There are three additional variants of the synergetic training device.

Figure 8:
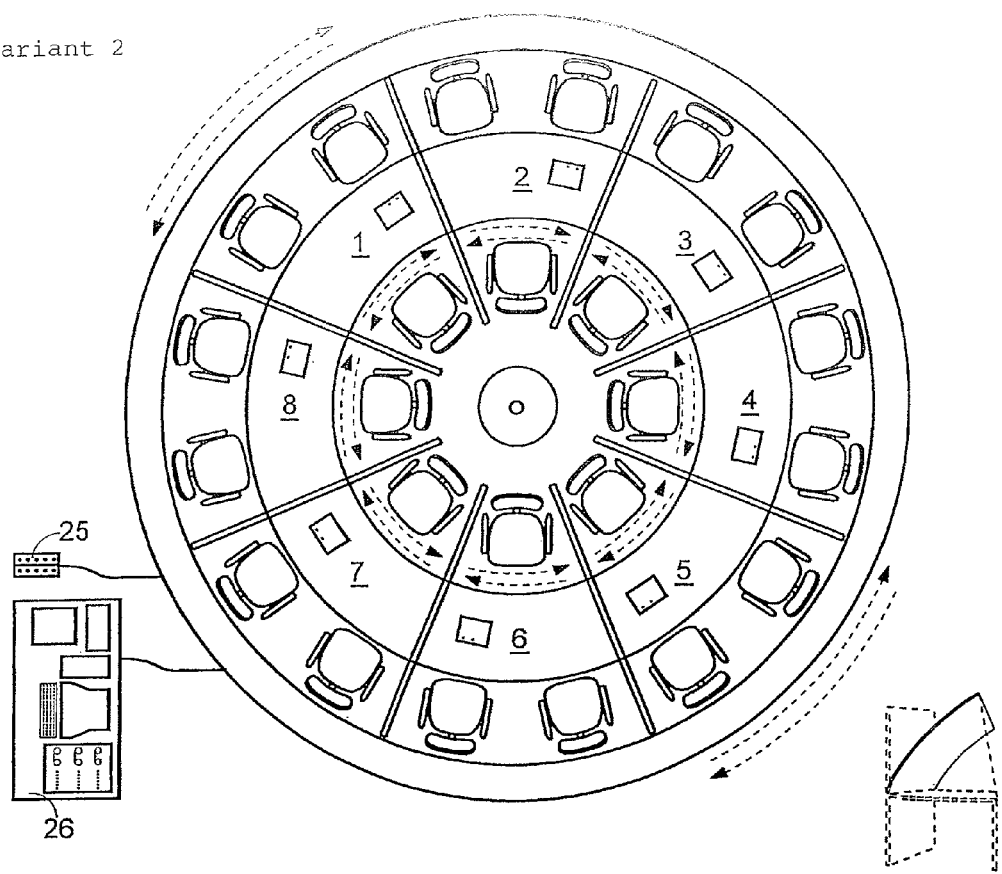
FIG. 8 is a plan view of the synergetic training device of the second variant.
Figure 9:
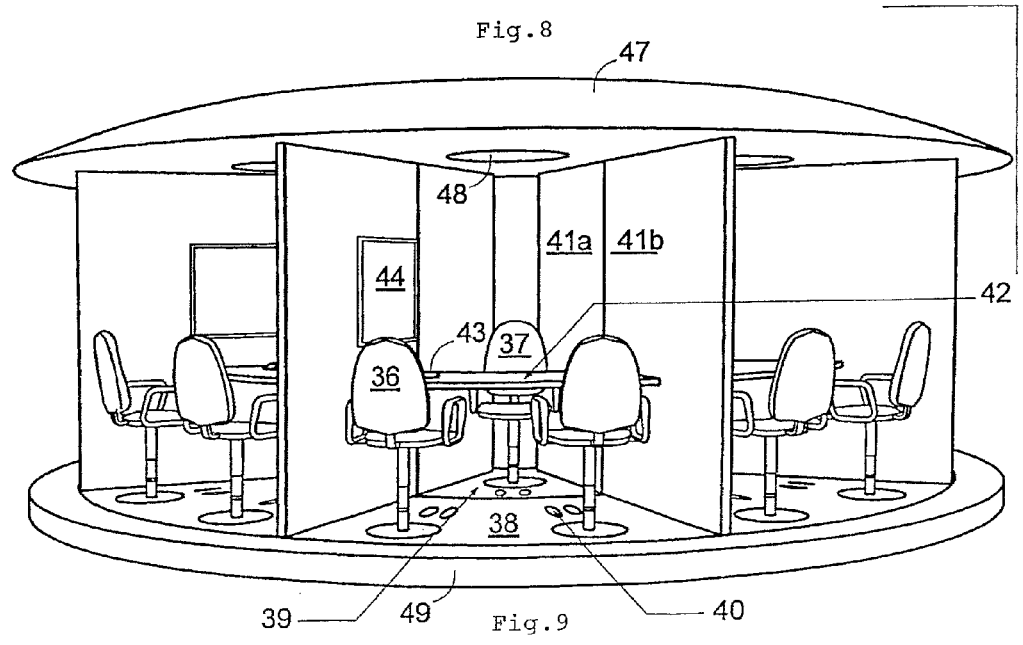
FIG. 9 is a general view of a cabin of the synergetic training device of the second variant.

Variant 2. General plan view of the second variant of the synergetic training device is shown in FIG. 8. As it is seen in the Figure, the device comprises eight three-seat sound-proof booths (1-8). The booth is shown in FIG. 9. It comprises a central part of the suspended floor 39 and an outer part of the suspended floor 38, both equipped with photonic elements 40; a border 49; two parts of the soundproof partitions 41, a central part 41a and an outer part 41b; three seats 36 and 37, one of them, seat 37 of the inner row, faces two other seats 36 of the outer row; a table 42 with the top capable to be raised under an angle. There are technical means 43 and a whiteboard 44, a roof 47 and photonic lamps 48. This variant is designed for teaching eight groups with two students in each group. The seats for students are in the outer part of the device. This variant can be transformed into variants 1, 3 and 4. The general view of the second variant of the synergetic training device is in FIG. 15.

Figure 10:
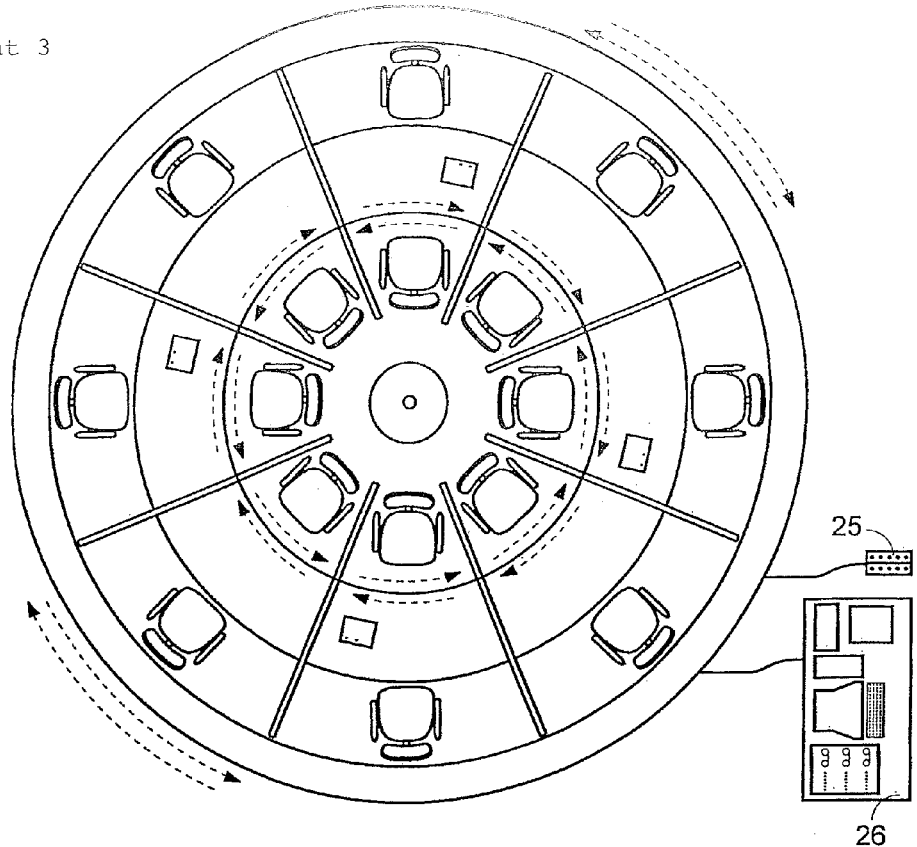
FIG. 10 is a plan view of the synergetic training device of the third variant.
Figure 11:
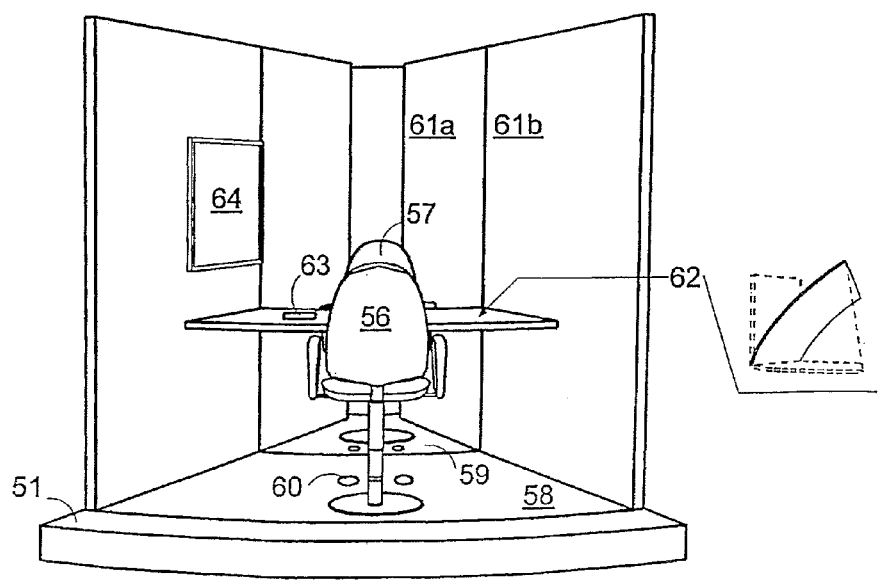
FIG. 11 is a general view of a cabin of the synergetic training device of the third variant.
Figure 16:
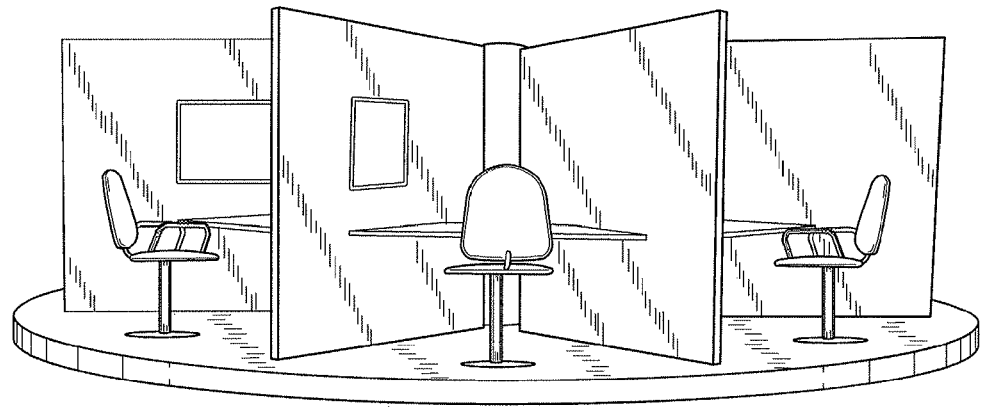
FIG. 16 is a general view of the third variant of the device

Variant 3. General plan view of the second variant of the synergetic training device is shown in FIG. 10. As it is seen in the Figure, the device comprises eight two-seat sound-proof booths. The booth is shown in FIG. 11. It comprises a central part 59 of the suspended floor and an outer part 58 of the suspended floor with photonic elements 60; a border 51; two parts of the soundproof partitions 61, a central part 61a and an outer part 61b; two seats 56 and 57 facing each other; a table 62 with the top capable to be raised under an angle. There are technical means 63 and a whiteboard 64. This variant is designed for individual teaching of students with assistants. Seats for students can be positioned not only in the outer part of the device but in the central part too. This variant can be transformed into variants 1, 2 and 4. The general view of the third variant of the synergetic training device is in FIG. 16, side view.

Figure 12:
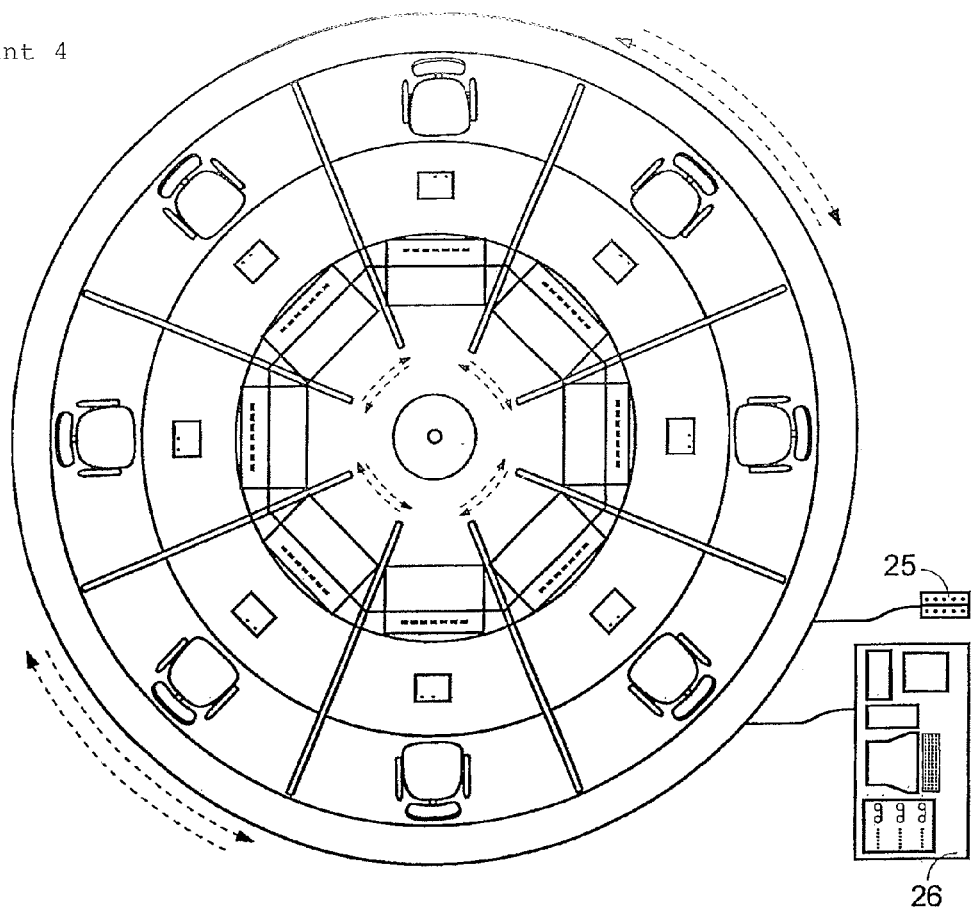
FIG. 12 is a plan view of the synergetic training device of the fourth variant.
Figure 13:
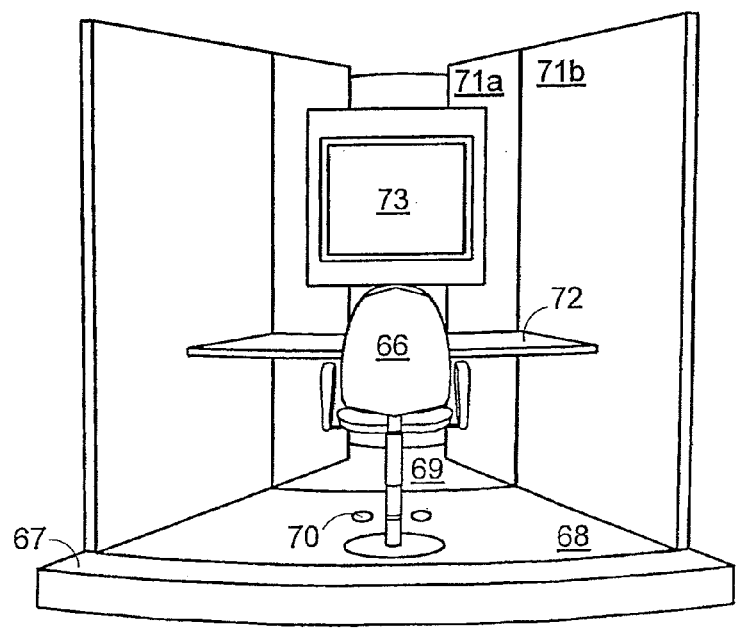
FIG. 13 is a general view of a cabin of the synergetic training device of the fourth variant.
Figure 17:
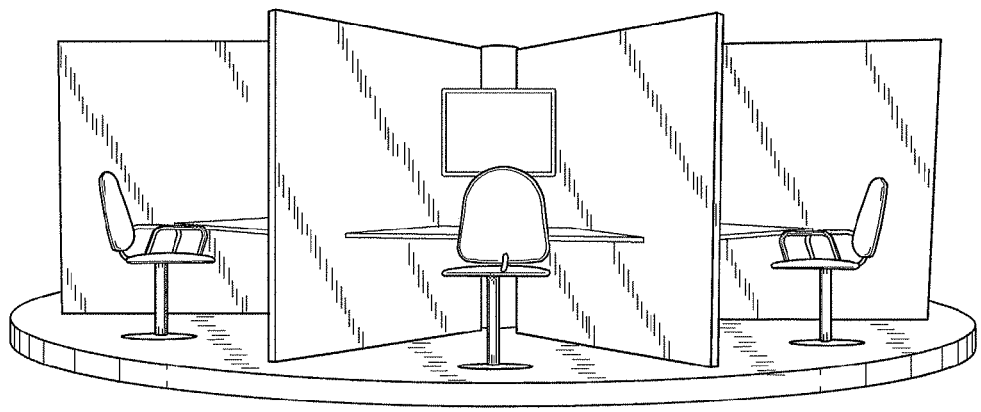
FIG. 17 is a general view of the fourth variant of the device

Variant 4. General plan view of the fourth variant of the synergetic training device is shown in FIG. 12. As it is seen in the Figure, the device comprises eight one-seat sound-proof booths. The booth is shown in FIG. 13. It comprises a central part of the suspended floor 69 and an outer part of the suspended floor 68 with photonic elements 70; a border 67; two parts of the soundproof partitions 71, a central part 71a and an outer part 71b; a seat 66; a table 72; a training apparatus 73; wherein a control panel is mounted at a place of the outer row 66. This device is a training room devised for short training (intensive automation) of vocational skills in various types of activity including cybersport: training garners (players) for computer competitions. This variant is designed for intensive modification of training programs. The variant can be transformed into variants 1, 2 and 3. The general view of the fourth variant of the synergetic training device is in FIG. 17, side view.

There are three methods of controlling operations of the device: a) by a special processor 10 (FIG. 6A) of photonic elements using mixed wire and wireless methods; b) by a processor of the outer computer of the central control unit 26 (FIG. 6A) using wire and wireless methods (see also FIG. 1, FIG. 8, FIG. 10, FIG. 12); and c) by a manual control panel 25 using wire method (FIG. 1, FIG. 8, FIG. 10, FIG. 12).

For strict control of the work part rotation there can be two lines of the sensor system: autonomous and combined. In such case two programs are developed for the two lines. An autonomous program is for a special processor of photonic elements, and a combined program is for the outer computer of the central control unit.

The steps of the lines of the sensor system operation are: sending a plurality of output signals by pressing the photonic elements, receiving the plurality of the output signals from the photonic elements, processing said plurality of the output signals, and selecting a required action.

Figure 6:
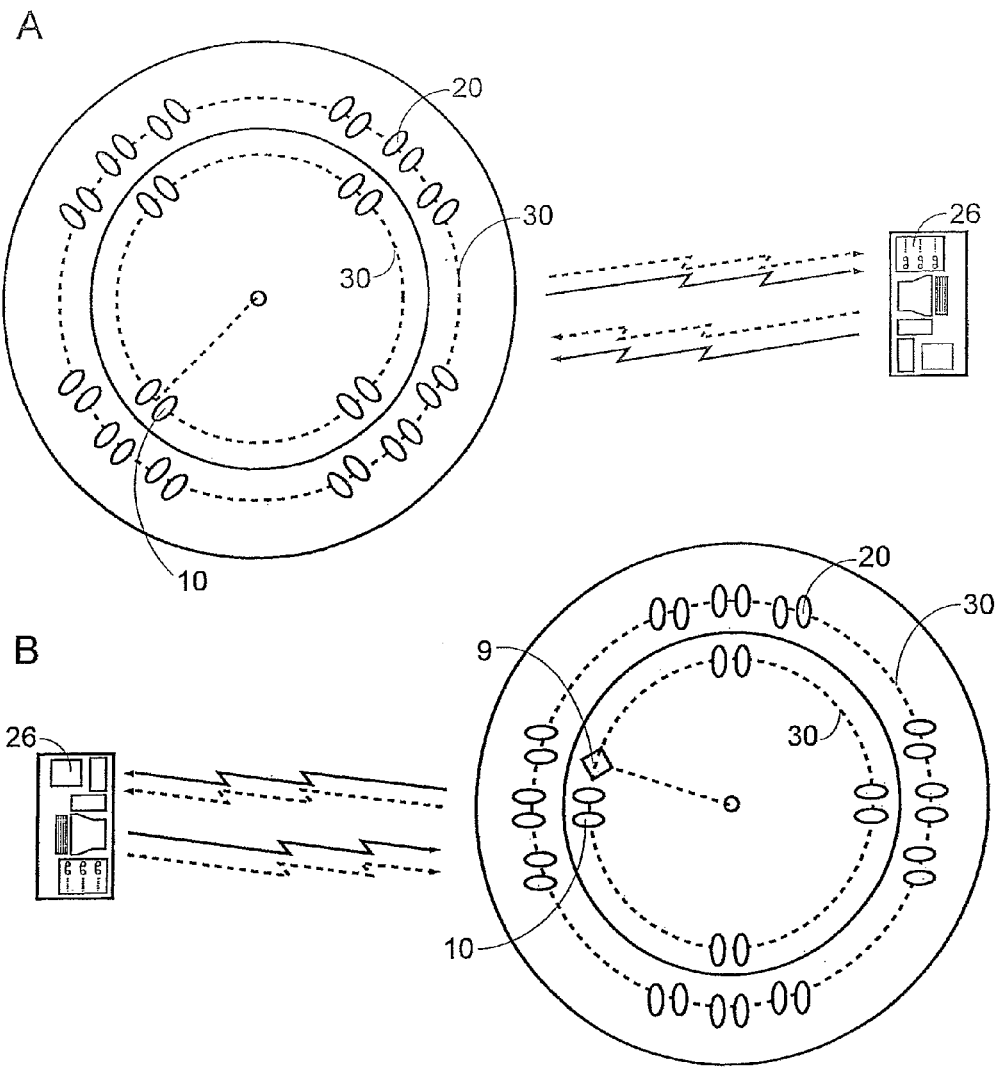
FIG. 6A is a diagram of controlling the sensor system.
FIG. 6B is a diagram of controlling the sensor system, a sophisticated variant.

FIG. 6A shows the photonic elements 20 with microcircuits printed in conducting ink (see microcircuits 32 in FIG. 7) compose an independent line of the sensor system 30 using inner combined (wire and wireless) method of communication. This line functions when there are no inner line of personal computers used as technical teaching means in the synergetic training device.

The special processor 10 of photonic elements of the sensor line 30 continuously connected to the power supply line of low voltage connects the line 30 of the photonic elements to said power supply line causing them to emit light. The current flowing through the photonic elements 20 activates their printed microcircuits (see microcircuits 32 in FIG. 7). When the photonic elements 20 are loaded by touching the sensory part by soles of students (the microcircuits printed in the conducting ink), a signal is formed and passed to the microcircuits of said elements. The microcircuits of the photonic element 20 in its turn sends the signal by a wireless method to the special processor 10 where it is processed. If all elements are loaded, the program connects the drives 14 and 15 (FIG. 3) to the inner AC network of the device by the wire method. The universal driving system provides for smooth and accurate rotation of the wheels, control of the rotation speed, change in the direction of the rotation, and a move for the distance equal to one booth.

If the photonic elements are not loaded, the special processor 10 activates the layers of their outer figures printed in the conducting ink (see figures 34 in FIG. 7) functioning as membranes and loudspeakers to reproduce sounds stored in the memory of the photonic element microcircuits. Thus, the special processor of the device functions as a local controller of the group of elements of one type—photonic elements, and controls the sensor system and the rotation of the device. The special processor as well as microcircuits of other photonic elements has input and output channels for sending information to computers of the inner and outer computer lines.

The photonic elements 20 with the microcircuits printed on paper with conducting ink and the outer computer of the central control unit 26 compose an integrated line of the sensor system of the mixed (wire and wireless) method on communication. This line operates also when the device has no inner line of personal computers. The outer computer has not only a data processing unit but also a memory, a means for inputting data by a user, and means for wire/wireless input/output connection to the photonic elements.

The program of the outer computer of the central control unit 26 connects the line 30 of the photonic elements to the low voltage power supply line causing them to emit light. Electric current flowing through the photonic elements 20 activates their microcircuits printed in conducting ink. When the photonic elements 20 are touched by soles of students, a signal is formed and passed to the microcircuits of said elements and processed. When a query is received from the outer computer of the central control unit 26, the microcircuits send data about the state of the elements. If all elements are loaded, the computer program of the outer computer of the central control unit switches on the drives c14 and 15 (FIG. 3). If the photonic elements are not loaded, the outer computer through the microcircuits activates the printed figures of the conducting ink layers functioning as a membranes and loudspeakers reproducing audio files stored in the outer computer.

In case personal computers are used as technical teaching means (FIG. 6B), it is possible to rationalize the combined sensor system by additional placement of sensors 35 on the photonic elements with microcircuits 32 (FIG. 7) for sending output signal characterizing a parameter to be defined (contact of the sensitive elements of the sensors with an outer object). The line with the sensors enhances monitoring of the line of the sensor system with microcircuits. Each computer, in particular the head one of the inner computer line has an operating system, a user graphic interface, displaying means, and means for wire or wireless input/output communications.

The computer program of the outer computer of the central control unit 26 (FIG. 6B) controls through a code segment the head personal computer 9 (FIG. 6B) of the computer line of the synergetic training device. The head computer 9 in its turn sends commands to all device technical means interconnected by mixed (wire/wireless) means including the sensors of the sensor system photonic elements.

The central control unit 26 (FIG. 6B) sends query about the state of connected sensors of photonic elements 20 of the sensor line 30 to the head computer 9 (FIG. 6B) of the inner computer line of the synergetic training device. The head computer receives this command and sends back a report on the state of the sensors. The outer computer of the central control unit receives the information, processes it and selects a required action according to the program. If the system is responded that it is completely ready, i.e. all sensors of the photonic elements are loaded, the outer computer of the central control unit continues to react according to the common program; otherwise it sends a signal to the head computer of the inner computer line indicating where there is a violation and blocks further program run, at the same time switching on audio and light signals at the central control board 26 (FIG. 6B) and at the training devise (photonic elements) prompting the student to follow the instructions.

In the other words, if at least one photonic element of all sensor lines of the system is not loaded, the devise is not moved.

The lighting system comprises photonic lamps 28 (FIG. 2) in the form of plates connected to the AC network. It is controlled in two ways: by the special processor 10 (FIG. 6A) of the photonic elements, and by the outer computer of the central control unit 26 (FIG. 6A); the outer computer can send commands controlling the lighting system through the special processor 10 (FIG. 6A) of the photonic elements as well as through the head computer 9 (FIG. 6B) of the inner computer line of the synergetic training device.

Use of the synergetic training device in teaching is more effective when equipment stimulating self-study of student is provided. The device can be equipped with language laboratory line, computer line or a training line depending on the required subject. When the language laboratory line is used, the workplaces are equipped with common audio complexes, each of them comprises an individual control board, a tape recorder, and a head-phone and microphone set.

The computer line includes personal computers, wherein each computer comprises a system unit, an LCD monitor, a keyboard, and a mouse. In case of the training line work places are equipped with common training apparatus including a control panel and a display.

Some apparatuses are embedded in the tables; monitors have a movable base and can be adjusted in vertical and horizontal directions. The equipment can be used in an independent mode. There are variants of the work place technical means to be used:

work place of an assistant: a) no means (FIG. 2, FIG. 9); b) training means placed instead of the seat (FIG. 13, FIG. 17); c) complete set of means of the outer control unit (FIG. 1, FIG. 8, FIG. 10, FIG. 12);

work places of students: a) no means (FIG. 14); b) at least one set of language laboratory, computer or training line means is arranged in the booths (FIG. 8); c) complete set of means at the work places (FIG. 10, FIG. 12, FIG. 15, FIG. 16, FIG. 17).

Figure 15:
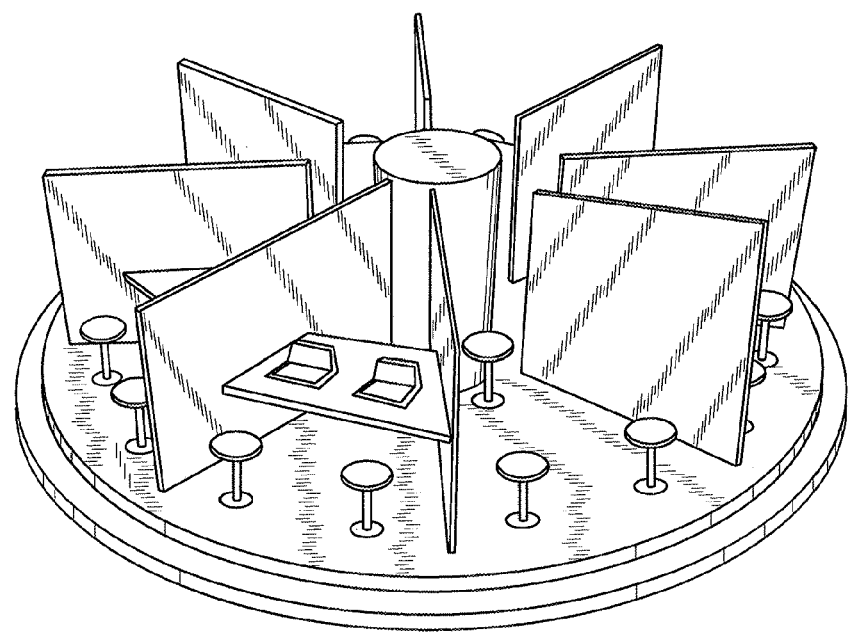
FIG. 15 is a general view of the second variant of the device

Devices with complete sets of technical means function as special-purpose teaching arrangements: a device with complete set of audio means is a language laboratory (FIG. 16); a device with a complete set of computers is a computer training classroom (FIG. 15).

For controlling operations in all lines, the central control unit 26 located outside the device (FIG. 1, FIG. 8, FIG. 10, FIG. 12) is provided with audio means (a control panel, a tape recorder, headphones, a microphone, an amplifier), a personal computer (a system unit, a monitor, a keyboard, a mouse), a printer and a scanner. Each line also includes net means, cables, cable channels and other elements required for a line.

Teaching method. Accelerated teaching with the synergetic training device provides for organizing teaching process based on the concepts of synergetics (theory of joint action in a nonlinear system). It also provides for accurate systematization (accurate grouping of elements and their presentation in the system), accurate and complex training and monitoring (detailed ways of training/learning information units and controlling acquisition of skills), using simultaneous stages of learning (elementary, intermediate and advanced), taking into account psychological and cultural differences of students (psychological types and dominant cultural styles of study activity). This method is a synergetic variant of intensive training.

According to the theory of synergetics appearance of a new property of a system is a moment of bifurcation (change of quality) wherein not one but multiple variants of transformation are carried out. A functioning high quality system uniformly distributes through feedback the positive property of the quality to all composing elements providing their qualitative development. In the other words, a bifurcation in education is a simultaneous qualitative augmentation of knowledge, a simultaneous qualitative augmentation of skills and abilities by each and all students due to highly organized teaching system.

The technical result of the claimed method is the organization of intensive training in accordance with the concepts of synergetics: whole, many-sided, content oriented training in the mode of intensive communication, information and logical link with all aspects of the study subject, taking into account all levels, psychological and cultural differences of students, using technical teaching means in the condition of continuous and uniform teaching of all students thereby achieving simultaneous progress in knowledge and dynamic development of highly effective skills of each student.

Said technical result is achieved due to studying new material, training and exchanging information between the participants of the teaching process, controlling and adjusting individual and group actions in the testing mode using the synergetic training device when the work element is periodically rotated determining strict time regulation and intensification of the teaching process. The device allows organizing a complex group form of teaching with of at least four assistants working simultaneously with four minigroups of students and their consecutive exchange. Process with minigroups provides for intensive training activity, simultaneous control of all steps in training and simultaneous cover of different aspects of the subject. In each following period the study material is trained with new students, and the study material is renewed depending on psychological and cultural differences of students, the study material of a lesson is introduced intensively in miniunits.

The technical result is also achieved due to alternate interaction with assistants and technical means playing the role of technical assistants being involved in well planed intersystem activity using the range of teaching systems, the intersystem being formed on the basis of each of the three technical lines: language, training, computer separately, and the combined teaching system being formed on the basis of all these lines together.

Methodological side of the process and general control are provided by a leading expert. The teaching process is controlled by assistants including the technical means. The teaching method comprises the following steps. The students take their seats in the device. During the first period the students are tested. When the first period is over, one part of the device is moved at a distance of one booth and stopped. The second period begins; the assistants continue to work on a new material with new students. When the second period is over, the same part is again moved in the same direction at a distance of one booth and stopped. The third period starts. The assistants again work on a new material with new students. The procedure is repeated till the moving part completes its full turn and the students go through training with all assistants in turn.

As mentioned above, in this teaching model the major form of teaching process is a lesson which is divided into a few periods depending on the variant of the device: for a device with four booths there can be only 4 periods; for a device with eight booths there are 8 periods. The first and the last periods are devoted to testing; other periods are devoted to introducing new material and working on it.

The method provides for introduction of a new study material so that at one lesson can be taught minigroups of different levels. Steps in learning are tested not only on a macro level (thematic concept) but also on minilevel—material of a period divided in three miniunits "a", "b" and "c" depending on the material complexity, variant "b" being a reference. The minigroups which cannot pass the test of this variant, are marked "c" in their record cards, and in the following periods they work with the content of said mark, for example "b"-"c"-"c"- . . . "c". If the content is easy, the mark is "a", for example "b"-"a"-"a"- . . . "a". If there are no problems, the minigroups work and released under the mark of the mini-content they started, for example, "b"-"b"-"b"- . . . "b". The system of exercises has variants taking into account psychological and cultural differences, the study material is changed both for students and assistants but for students the renovation is as if in a straight line under the mark of one step of teaching whereas for assistants it is in a curve with variants of different marks since the assistants work with students of different levels.

EXAMPLE 1

Use of the device with four four-seat booths (variant 1). The study material is introduced as one information unit in 2-3 aspects (types, forms of activity) in agreement with the student grade and level. In accordance with a strict system the study material is divided as follows: period 1 is activating knowledge (entry test); period 2 is introducing and exercising new material (total 55%); period 3 is repeating, introducing and training new material (total 45%); period 4 is controlling the result (final test).

EXAMPLE 2

Use of the device with eight three- or two-seat booths (variants 2 and 3). The study material is introduced as two information units (parts). When working with the first information unit (periods 1-4), 70% of the study material is used in 2 or 3 aspects, when working with the second information unit (periods 5-8), 30% of the study material is used in 1-2 new aspects depending on the grade and level of the students.

In accordance with a strict system the study material is divided as follows:

The first information unit: period 1 is activating knowledge (entry test); period 2 is introducing and exercising new material (total 25%); period 3 is repeating, introducing and training new material (total 25%); period 4 is repeating, introducing and training new material (total 20%).

The second information unit: period 5 is repeating, introducing and training new material (total 15%); period 6 is repeating, introducing and exercising new material (total 10%); period 7 is repeating, introducing and training new material (total 5%); period 8 is controlling the result (final test). For successful advance, passing all tests is obligatory, and if any student fails, the minigroup is shifted one level down.

Learning with an expert-assistant is interchanged with self study when only technical means (computers, audio means, professional training means) are used as technical assistants depending on the subject, educational goals and particular study material. The plans of introducing the means are selected in advance. It is better from methodological point of view when in the device with four booths 1 or 2 technical means are used, in the device with eight booths 2 or 4 means are used. There can be a variant: the means can be of one type, for example only computers, or mixed, for example computers and audio devices, various training apparatuses at the same time.

Teaching systems can be formed out of the technical means of the language, computer and training lines. The systems provide interaction between the means and the students and introduce study material in the form of miniunits. They also provide control of the educational process for evaluating the level of acquiring knowledge by the students and developing skills. A teaching system formed on the base of one of the technical lines has the name of the line (interlinear: language, computer, training), and a teaching system formed on the base of all technical lines is called integrated.

The devices completely equipped with the means can be used as language laboratories, computer classrooms and training centers. Devices with computers and a set of vocational training apparatuses can be used for forming, correction and automation of occupational skills in various fields of activity (transport, industry). Vocational training is carried out according to specially developed plans and computer programs. The number of assistants is substantially decreased to at least one expert for general control from the control unit.

As it follows from aforesaid, the didactic devise developed based on the synergetic concepts makes it possible to carry out a highly effective method of teaching including thorough training under conditions of continues and uniform interaction with each student taking into account ability of each student and achieving high level of acquiring knowledge and skills. Moreover, use of the synergetic training device provides for strict regulation in the teaching process thereby intensifying the process. Due to this, this method is called a synergetic variant of intensive training.

Thus, the essential features of the claimed invention are:

a) the features of the device: dynamic properties; spherical form of organization; variants of the structure and content; multifunctionality;

b) the features of the method: multiple purposes providing for simultaneous teaching of a big number of subject aspects (and big number of different subjects); many-level teaching which means that all stages of learning are taken into account simultaneously; high anthropological attitude since it is possible to take into account psychological and cultural differences of students; complex group form of organization with simultaneous teaching of minigroups of a large group of students and experts-assistants. In the other words, a synergetic training as a didactic type of training arrangements, a spherical (continued-concentric) type of a laboratory/classroom (language, computer, and training) and a synergetic variant of intensive teaching method are claimed. They provide trainees with highly effective multifunctional teaching system adjusting to their personality and securing intensive acquisition of knowledge and dynamic development of skills.

The invention claimed is:

1. A synergetic training device comprising soundproof booths equipped with teaching means and technical means; a lighting line and a sensor system comprising sensors, said device being controlled with a central manual control panel through cables and with an outer computer of a central control unit through a combined wire and wireless method, wherein the sensor system further comprises photonic elements with microcircuits produced by printing in conducting inks on a flexible substrate, said photonic elements being firmly fixed on a suspended floor and controlled in two ways: independently by a special processor of the photonic elements using internal wire/wireless connections, and concurrently by the outer computer of the central control unit using a wireless connection;

wherein said device has a roof with a lighting system comprising photonic lamps; drives; microcircuits of the photonic elements; and the outer computer of the central control unit;

wherein the booths are sphere segments combined in a circle consisting of two work elements, a central element and an outer element, wherein the central element comprises an inner metal wheel and a central part of the suspended floor with the photonic elements, central parts of soundproof partitions between the booths and an inner row of seats all firmly fixed to said inner metal wheel, and the outer element comprises an outer metal wheel and an outer part of the suspended floor with the photonic elements, the outer parts of the soundproof partitions and an outer row of seats, tables with raising tops and technical means all firmly fixed to said outer metal wheel, wherein said work elements can rotate independently in a predetermined mode, and when one work element rotates, the other remains stationary; and wherein each of said booths comprises a set of technical means including at least one of the following: a set of audio means, a personal computer, and a common training apparatus including a control panel and a display.

2. The device according to claim 1 comprising four four-seat booths, wherein in each of said booths one seat of the inner row faces three seats of the outer row, and at least one place in each booth is provided with a set of technical means comprising: audio means and a personal computer.

3. The device according to claim 1 comprising eight three-seat booths, wherein in each of said booths one seat of the inner row faces two seats of the outer row, and at least one place in each booth is provided with a set of technical means.

4. The device according to claim 1 comprising eight two-seat booths, wherein in each of said booths one seat of the inner row faces one seat of the outer row, and the places of the outer row of at least four booths are provided with a set of technical means.

5. The device according to claim 1 comprising eight one-seat booths, wherein in each of said booths there is a training apparatus in front of the seat of the outer row.

6. The device according to claim 1 wherein each work place is provided with a set of audio means.

7. The device according to claim 1 wherein each work place is provided with a computer.

8. The device according to claim 1 wherein each work place is provided with technical means of a mixed type.

9. The device according to claim 1 wherein each photonic element comprises a thin plate of a photon-emitting plastic, a layer of microcircuits produced by printing in conducting ink on paper, and a sheet of strong paper with figures of conducting ink layers functioning as a membrane and loudspeakers.

10. The device according to claim 1 wherein the special processor of the photonic elements has limited functions: monitoring the state of the photonic elements, transferring information to computers through in/out channels, activating layers of figures of conducting ink to reproduce sound, and connecting the photonic elements, the photonic lamps, and drives to an AC network.

11. The device according to claim 1 wherein the system of controlling the photonic elements comprises the special processor of the photonic elements and a head computer of an inner computer line.

12. The device according to claim 1 wherein the central element of the device comprise the inner metal wheel and the central part of the suspended floor with the photonic elements, and the central parts of the soundproof partitions and the inner row of seats all firmly fixed to said inner metal wheel periodically move for a distance of one booth, while the outer element is static, and the procedure is repeated until the moving central part element completes its full turn.

13. The device according to claim 1 wherein the outer work element of the device comprise the outer metal wheel and the outer part of the suspended floor with the photonic elements, and the outer parts of the soundproof partitions, the outer row of seats, tables with raising tops and technical means all firmly fixed to said outer metal wheel periodically move for a distance of one booth, while the central element is static, and the procedure is repeated until the moving outer element completes its full turn.

14. The device according to claim 1 wherein the lighting system comprises the photonic lamps, the drives, and a head computer of an inner computer line.

15. The device according to claim 1 wherein the lighting system comprises the photonic lamps, the drives, and a special processor of the photonic elements.

\* \* \* \* \*